United States Patent [19]

Allen et al.

[11] Patent Number: 5,435,472

[45] Date of Patent: Jul. 25, 1995

[54] FOLDING CARRIER AND SECURING SYSTEM THEREFOR

[76] Inventors: Richard A. Allen; Christopher B. Allen; Alexander R. Allen, all of 29 Devens St., Concord, Mass. 01742

[21] Appl. No.: 186,814

[22] Filed: Jan. 25, 1994

Related U.S. Application Data

[63] Continuation of Ser. No. 954,298, Sep. 30, 1992, abandoned.

[51] Int. Cl.⁶ ............................................. B60R 9/10
[52] U.S. Cl. ................................. 224/493; 224/314; 224/324; 224/497; 224/508; 224/924
[58] Field of Search ............... 224/314, 324, 42.03 B; 16/321, 323, 324, 335, 319, 357

[56] References Cited

U.S. PATENT DOCUMENTS

| | | | |
|---|---|---|---|
| 1,480,647 | 1/1924 | Walters | 16/324 |
| 3,344,462 | 10/1967 | Webster | 16/357 |
| 3,927,811 | 12/1975 | Nussbaum | 224/42.03 B |
| 4,747,528 | 5/1988 | Kamaya | 224/315 |
| 4,997,116 | 3/1991 | Grim | 224/42.03 B |
| 5,056,700 | 10/1991 | Blackburn et al. | 224/324 |
| 5,135,145 | 8/1992 | Hannes et al. | 224/314 |
| 5,211,323 | 5/1993 | Chimenti et al. | 224/314 |

Primary Examiner—Renee S. Luebke
Attorney, Agent, or Firm—Herbert L. Bello

[57] ABSTRACT

A foldable carrier that is mountable upon a vehicle includes rotatably connected frame, carrying, and supporting members. The carrying member is constrained for limited rotational movement relative to the frame between a carrying position and a stored position. A locking element, including a latch means and an arm means, positively locks the carrying member in its extended operational position, thus preventing collapse of the carrier after it is in use. Bicycles and other items are secured to the carrier using a tie-down system including either strap securing elements positioned on the ends of the carrying members arms or a series of mounting elements slidably positioned on the arms of the carrying member.

3 Claims, 7 Drawing Sheets

FOLDING CARRIER AND SECURING SYSTEM THEREFOR

This application is a continuation of applicant's application Ser. No. 07/954,298, filed Sep. 30, 1992 and now abandoned.

BACKGROUND OF THE INVENTION

1. Field of the Invention

The present invention relates to carriers that are configured to be attached to motor vehicles. More particularly, the invention is directed towards mechanisms for locking a carrier in a given configuration and for securing items to the carrier.

2. Description of the Prior Art

A variety of collapsible bicycle carriers that are configured to be mounted on motor vehicles are available in the prior art. Examples of carriers which are mountable on automobiles are shown in U.S. Pat. Nos. 4,518,108 and 4,709,840.

In certain types of collapsible carriers, bicycles are carried on a pair of carrying arms that are pivotally mounted on a frame structure. The carrying arms are held in an extended or carrying position by a pair of braces that are positioned between the frame and carrying arms. The bicycles are positioned on the extended carrying arms and secured thereto using, for example, a pair of straps.

A need has arisen for a collapsible bicycle carrier in which the carrying arms are positively locked in an extended position and easily released to a stored position. Furthermore, a need exists for a tie-down system for securing the bicycles on the carrying arms.

SUMMARY OF THE INVENTION

It is an object of the present invention to provide a folding carrier which does not suffer from the foregoing disadvantages and limitations.

It is another object of the present invention to provide a locking apparatus that positively secures a carrier in its extended position and facilitates movement of the carrying arms between their extended and collapsed positions.

It is a further object of the present invention to provide a carrier with a tie-down system for securing articles to the carrying arms.

The carrier of the present invention is generally characterized by a frame, a carrying member, a supporting member, a locking element, and a strap tie-down system. The carrying and supporting members are pivotally mounted to the frame and constrained for movement between collapsed and extended positions. In operation, the locking element positively locks the carrying member in its extended position. The locking element is designed to permit easy unlocking of the carrying member and to facilitate movement of the carrying member to its collapsed position.

The locking element includes an arm that is pivotally mounted to the carrying member, a latch that is fixed to the frame, and a bias means. The bias means is connected to the arm of the locking element and the frame of the carrier. The arm is sized and shaped to slide in a hook-shaped slot in the latch. The bias means positively locks the arm in the slot when the carrying member is in its extended position. The bias means also assists in releasing the arm from its locked position so as to enable movement of the carrying member to its collapsed position.

In one embodiment of the invention, the strap tie-down system includes a securing element that is mountable on the free ends of each carrying member. This embodiment of the invention is used in conjunction with a strap secured to the carrying member of the bicycle carrier. The securing element includes first and second sections configured to engage the strap and maintain it at a selected tension. The first section can have a C-shaped profile with an opening that is oriented in a direction away from the carrying member. The second section can have a V-shaped profile. Alternatively, the strap securing element can include a clamp having an L-shaped flange which snugly engages the strap.

In another embodiment of the invention, the strap tie-down system includes a plurality of mounting means each having a body with a cradle means formed on its outer surface. At least one strap is connected to the cradle means, a snap-action buckle being provided at one end of each strap. Each mounting means is sized and shaped to be fitted on, and secured to, a carrying member. The cradle means includes an indentation having a cross-sectional configuration which is substantially congruent with that of the material forming the frame of the bicycle. In operation, a bicycle is placed in the indentation of the cradle means. To secure the bicycle to the carrying member, the strap is placed over the frame of the bicycle, threaded through the snap-action buckle, tightened and locked in the buckle. Adjacent mounting means can be separated by a spacer so as to provide a suitable gap between adjacent bicycles placed on the carrier.

Other general and specific objects of the invention will in part be obvious and will in part appear hereinafter.

The invention accordingly comprises the steps and apparatus embodying features of construction, combinations of elements and arrangements of parts adapted to effect such steps, as exemplified in the following detailed disclosure. The scope of the invention is indicated in the claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
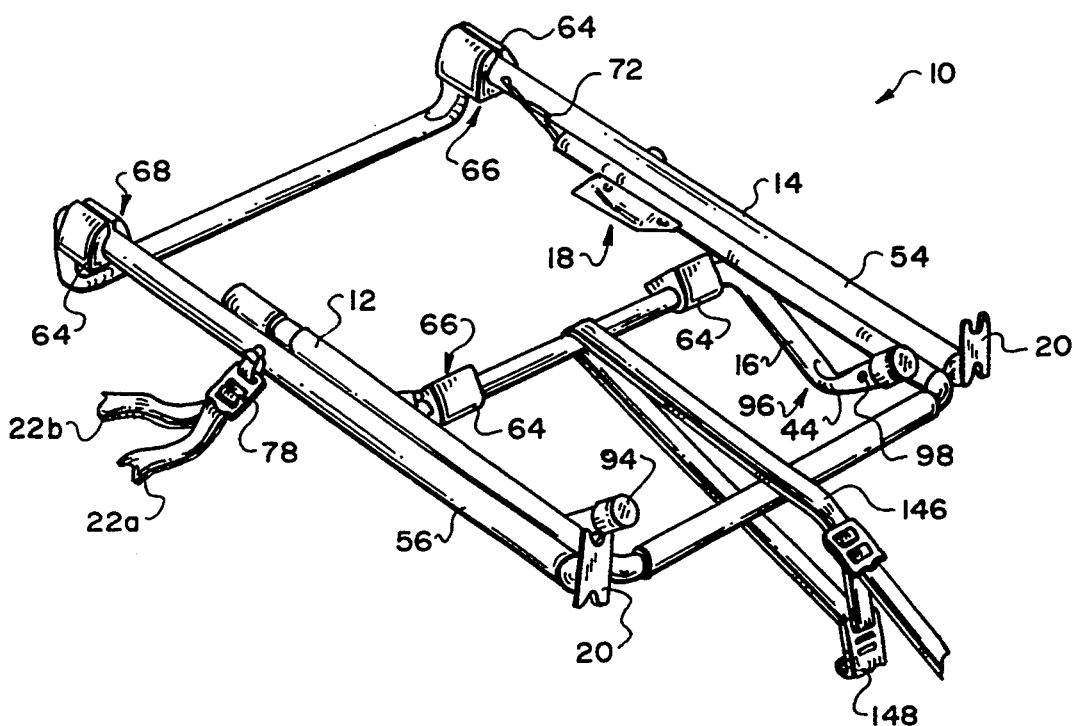
FIG. 1 is a perspective view of a foldable carrier embodying the invention.

Referring to FIGS. 1 through 9B, wherein like reference numerals refer to like parts, there is illustrated a foldable carrier 10. The foldable carrier 10 includes a carrying member 14 and supporting member 16 rotatably mounted on a frame 12. The carrying member 14 and supporting member 16 are constrained for limited rotational movement relative to the frame 12 between extended carrying positions and collapsed stored positions. A locking element 18 is provided for positively locking the carrying member 14 in its extended carrying position. A strap tie-down system 19, having straps 22, shown in FIGS. 5A through 7B, is provided for securing articles, for example, bicycles, on carrying member 14.

Figure 3:
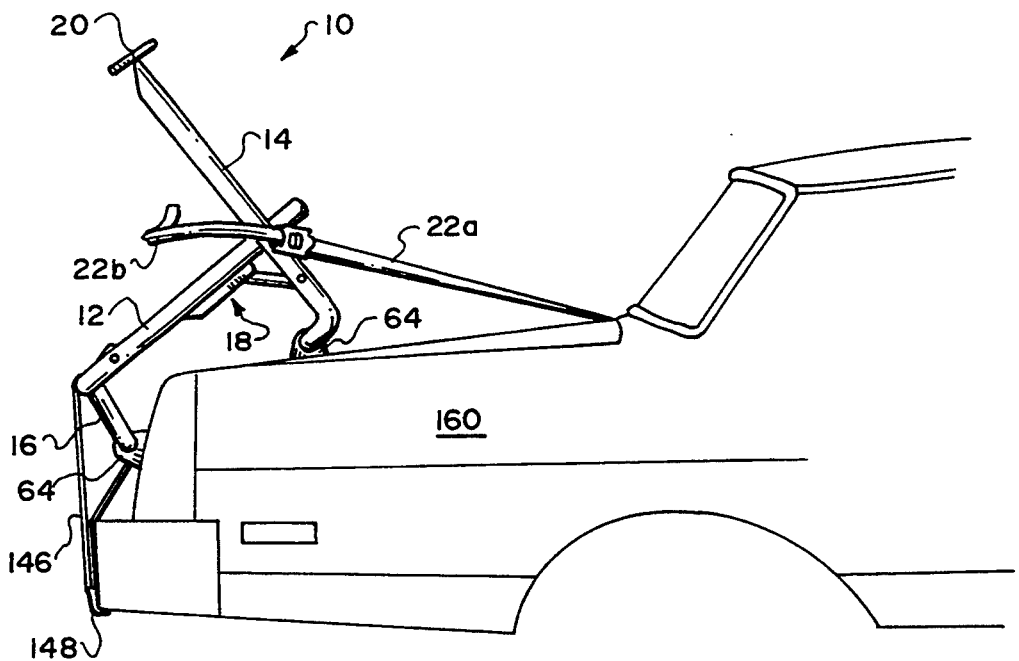
FIG. 3 is a side view of the carrier of FIG. 1 mounted on the trunk of an automobile.
Figure 2:
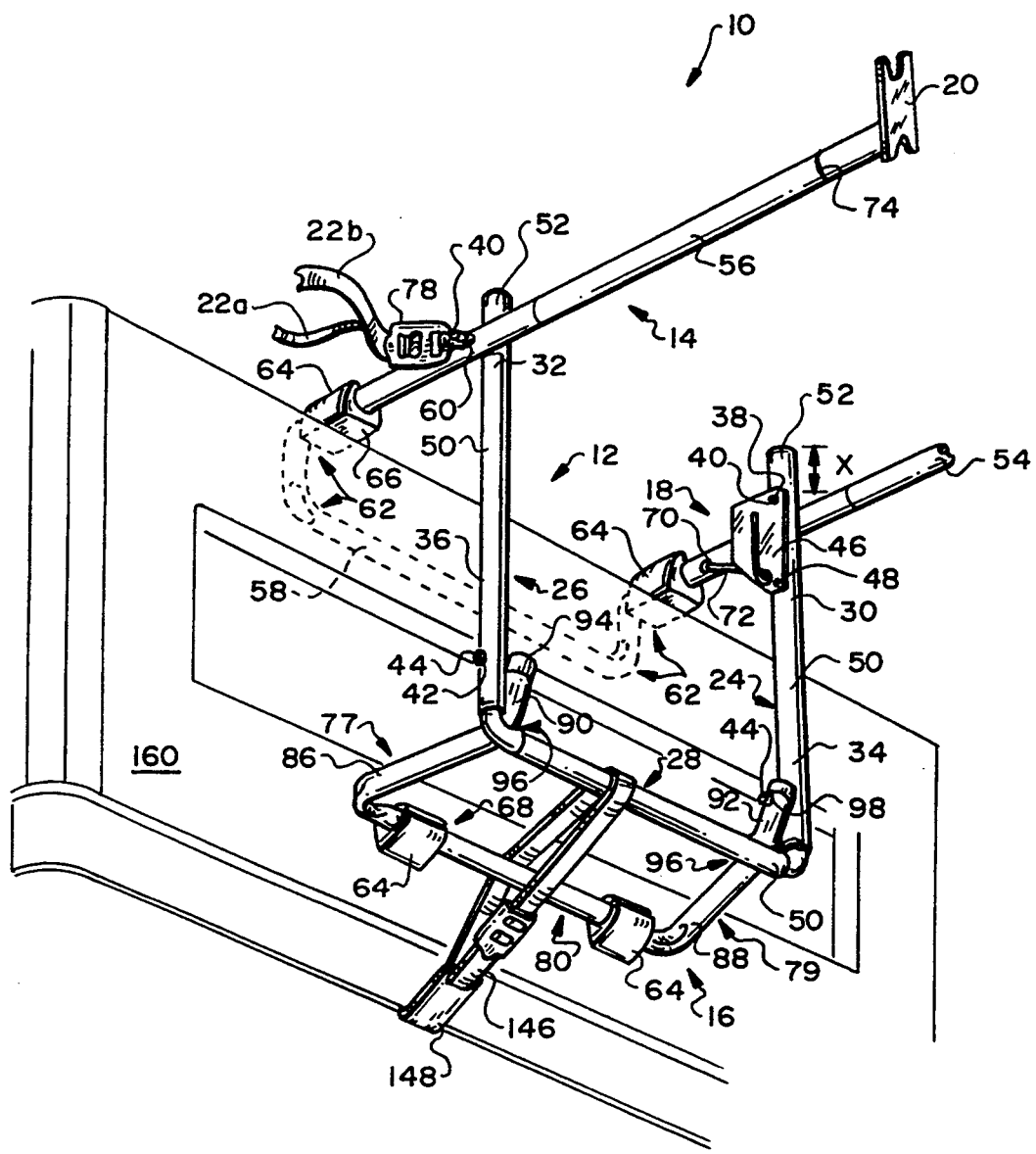
FIG. 2 is a perspective view of the carrier of FIG. 1 in its carrying position and attached to the tailgate of a vehicle.

As best shown in FIGS. 1 through 3, the frame 12 is a substantially U-shaped member having a pair of legs 24, 26 and a cross member 28. The legs 24, 26 and cross member 28 are of sufficient size to provide mechanical support for the carrying member 14 and supporting member 16. Leg 24 has an upper portion 30 and a lower portion 34. Leg 26 has an upper portion 32 and a lower portion 36. Each of the upper portions 30 and 32 includes an aperture 38 sized to receive a pin, bolt or other fastener 40 which rotatably connects the frame 12 to the carrying member 14. As best shown in FIG. 2, the apertures 38 are positioned a distance "X" from the ends of the upper portions 30 and 32 of the legs 24 and 26. The distance "X" is selected such that upon rotation of the carrying member 14 to its extended position, a segment of the upper portions 30 and 32 will extend above the carrying member 14 thus providing a surface against which items placed on the foldable carrier 10 can rest. The lower portions 34 and 36 each include an aperture 42 sized to receive a pin, bolt or other fastener 44 which rotatably connects the frame 12 to the supporting member 16. The apertures 38 and 42 are positioned so as to form two parallel axis of rotation. The frame 12 can be manufactured from virtually any strong durable material, such as aluminum, steel, or polymeric composites, preferably, aluminum tubing. The locking element 18, in particular a latch means 46, is connected to the inner surface of the upper portion 30 of the leg 24 via fastener 40 and a second pin, bolt or other fastener 48. A protective sleeve 50 composed of, for example, plastic or rubber, is fitted over the legs 24 and 26 and the cross member 28. A protective plastic cap 52 also composed of, for example, plastic or rubber, can be used to cover the ends of the frame 12 extending beyond the carrying member 14 and denoted "X" in the FIGURES.

The carrying member 14 is mounted on the frame 12 such that it can be rotated between a carrying position and a stored position. In the carrying position (FIG. 2), the carrying member 14 is oriented substantially perpendicular to the frame 12. In the stored position (FIG. 1), the carrying member 14 and frame 12 are in substantially side-by-side relationship. The carrying member 14 is a substantially U-shaped member comprising a pair of arms 54, 56 and a front foot bar 58. Each arm 54, 56 has an aperture 60 for receiving the pin, bolt or other fastener 40 which rotatably connects the carrying member 14 to the frame 12. Accordingly, the apertures 60 are positioned such that upon assembly of the foldable carrier 10 they are in alignment with the corresponding apertures 38 of the frame 12. The arm 54 also includes an aperture 70 into which is pivotally mounted an arm means 72 of the locking element 18. In one embodiment of the invention, a terminal portion of each of the arms 54 and 56 can have a strap securing element 20 positioned thereon. In an alternative embodiment shown in FIGS. 8A through 9B, an equal number of mounting means 23, can be slidably mounted on each of the arms 54 and 56. The arms 54 and 56 are connected to the front foot bar 58 via a series of bends 62 which permit the foldable carrier 10 to be attached to the tailgate of a vehicle 160. The carrying member 14 is typically formed of materials similar to that of the frame 12, preferably aluminum tubing. A first pair of feet 64 manufactured from, for example, rubber and having a flat bottom surface 66 and split circular section 68 are positionable on the front foot bar 58. When the foldable carrier 10 is mounted on a vehicle 160, as shown in FIGS. 2 and 3, the feet 64 provide a non-slip contact surface that also prevents scratching of the finished surface of the vehicle 160 as a result of contact between it and the foldable carrier 10.

The supporting member 16 is a substantially U-shaped member comprising a pair of legs 77, 79 and a rear foot bar 80. The legs 77 and 79 are bent so that each has an upper portion 86 and 88 and a lower portion 90 and 92. Lower portions 90 and 92 extend obliquely from the upper portions 86 and 88. A protective boot 94 manufactured from, for example, plastic or rubber, is fitted over the end of lower portions 90 and 92. Stop elements 96 are defined by the bends at the junctions of the upper portions 86 and 88 and the lower portions 90 and 92. The stop elements 96 restrict and limit the rotational movement of the supporting member 16 relative to the frame 12. In particular, the stop elements 96 maintain the supporting member 16 substantially perpendicular to the frame 12 when the carrier 10 is moved to its carrying configuration (FIG. 2) from its stored position (FIG. 1). Finally, each of the lower portions 90 and 92 includes an aperture 98 sized to receive a pin, bolt or other fastener 44 which rotatably connects the frame 12 to the supporting member 16. Accordingly, the apertures 98 are positioned such that upon assembly of the foldable carrier 10 they are in alignment with the corresponding aperture 42 of the frame 12. A second pair of feet 64 is typically mounted on the rear foot bar 80. Typically, the supporting member 16 is manufactured from aluminum tubing.

In the embodiments shown in FIGS. 5A through 7B, a strap 22, preferably manufactured from nylon, is attached to each of the arms 54 and 56 of the carrying member 14. The strap 22 includes a first strap portion 22a which secures the carrier 10 to the vehicle 160 and a second strap portion 22b which secures items to the carrying member 14. Each strap portion 22a and 22b is attached to a buckle 78. The buckles 78 are connected to arms 54 and 56 using fasteners 40. The straps 22a and 22b are then threaded through the buckles 78 and fastened thereto using techniques familiar to those skilled-in-the-art. The strap 22 is sized so that it has the requisite strength for securing the carrier 10 to the vehicle 160 while remaining capable of being secured to the strap securing means 20 positioned on the end of the arms 54 and 56. The strap 22 is typically between two and three feet long. Strap portion 22b, which is utilized to secure articles to the carrying member 14, is unnecessary when the mounting means 23 shown in FIGS. 8A through 9B, and described below, are employed.

Figure 4:
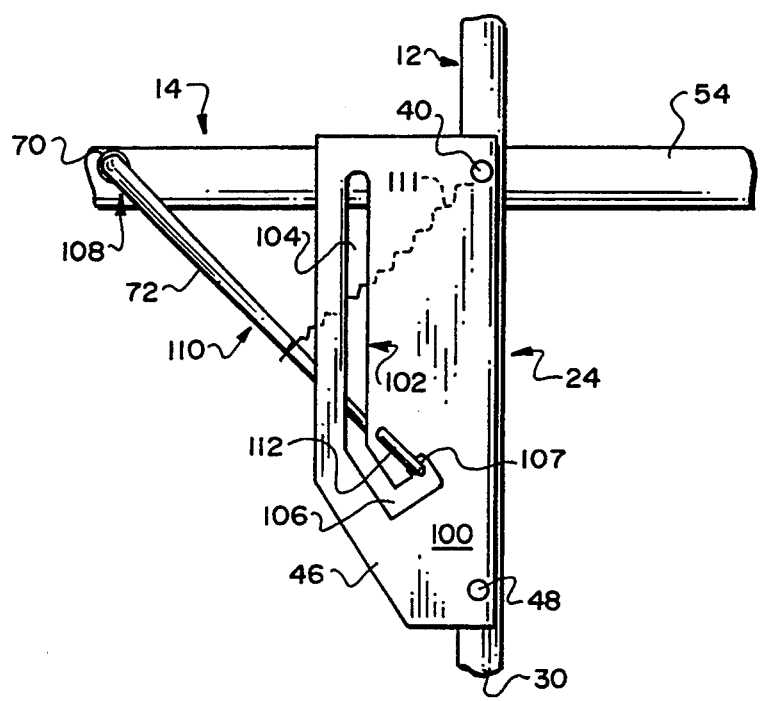
FIG. 4 is a side elevation of the locking element of FIG. 1.

Referring now to FIG. 4, it will be seen that the locking element 18 generally includes a latch means 46, an arm means 72, and a bias means 111. The latch means 46 is mounted on the frame 12 using fasteners 40 and 48. The arm means 72 is pivotally mounted in aperture 70 of the carrying member 14. A first end of the bias means 111 is attached to the fastener 40 while a second end is slidably connected to the arm means 72. The bias means 111 serves to positively lock the arm means 72 in the slot 102 when the foldable carrier 10 is in its extended position. The bias means 111 preferably is a tension spring.

The latch means 46 is a plate or flange 100 composed of aluminum or steel, for example, and having a slot 102. The slot 102 has a hook-shaped configuration, i.e., it has a linear portion 104 and a terminal U-shaped portion 106 having a latch 107 at a terminal end. The slot 102 is positioned a sufficient distance from the frame 12 to insure unimpeded movement of the arm means 72. Further, the slot 102 has a width sufficient to permit jam-free movement of the arm means 72 during movement of the carrying member 14 relative to the frame 12.

The arm means 72 typically is an aluminum rod having a first segment 108, a shank 110, and a U-shaped end 112. The first segment 108 is sized to be positioned in the aperture 70 of the carrying member 14 and is perpendicular to the shank 110. The shank 110 has a length such that the end 112 can be appropriately positioned in the slot 102 when the foldable carrier 10 is in either its extended or collapsed position. Typically the shank 110 is between four and five inches in length. The end 112 is hook-shaped to prevent the arm means 72 from disengaging the latch means 46 during operation. End 112 extends into the slot 102, its curved portion sliding within the slot 102 when the carrying member 14 is moved relative to the frame 12.

In operation, the locking element 18 positively locks the frame 12 and carrying member 14. Further, as the carrier 10 collapses to its stored position (FIG. 1), the bias means 111 pulls on the arm means 72 so as to assist in bringing the frame 12 and carrying member 14 into juxtaposition. When, however, the carrying member 14 is pivoted to its operative extended position (FIG. 2) the arm means 72 travels along the slot 102. As the frame 12 and carrying member 14 move into substantially perpendicular relation, the end 112 of the arm means 72 reaches the end of the U-shaped portion 106 and, more particularly, latch 107. At this point, the tensioning force of the bias means 111 pulls the end 112 of the arm means 72 into the latch 107 preventing further relative movement of the frame 12 and carrying member 14. To release the arm means 72 once it is positioned in the latch 107, a force greater than, and in opposition to, the tensioning force of the bias means 111 must be exerted on the arm means 72. This action causes the arm means 72 to pop out of the latch 107. As the frame 12 and carrying member 14 pivot into juxtaposition, arm means 72, with the aid of bias means 111, travels back along slot 102 until it once again reaches the free end of the linear portion 104 of the slot 102.

The tie-down system 19 depicted in FIGS. 5A through 7B includes a strap securing element 20 positioned on each of the ends of arms 54 and 56 of the carrying member 14. The strap securing element 20 is configured to engage the second strap portion 22b and maintain it at a selected tension.

Figure 5A:
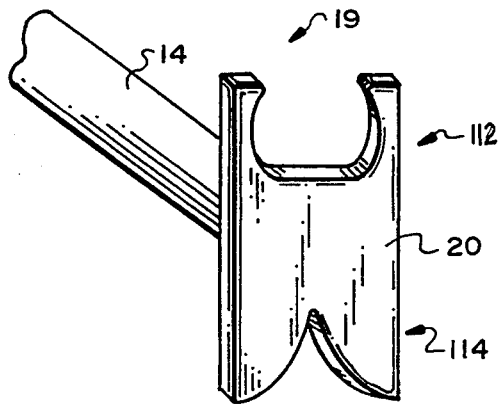
FIGS. 5A, 6A, and 7A depict perspective views of alternative configurations of a strap securing element of a first embodiment of the strap tie-down system of the invention useful in connection with the carrier of FIG. 1.
Figure 5B:
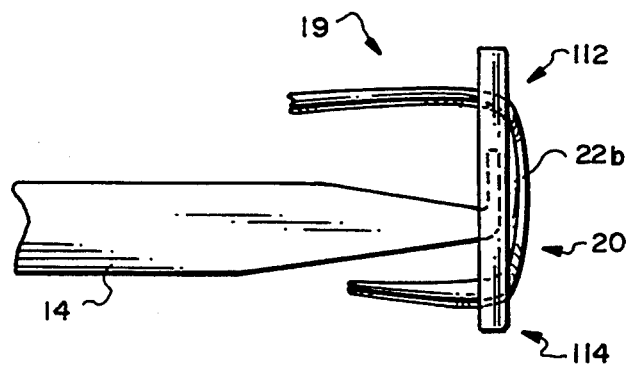
FIGS. 5B, 6B, and 7B depict side elevations of the strap tie-down system depicted in FIGS. 5A, 6A, and 7A, respectively.

In the configuration depicted in FIGS. 5A and 5B, the strap securing element 20 includes a first section 112 and a second section 114. The first section 112 has a C-shaped profile, the opening in the profile being oriented in a direction away from the carrying member 14. The second section 114 has a V-shaped profile. In operation the second strap portion 22b is threaded through the C-shaped opening in first section 112 and then drawn tightly into the apex of the V-shaped profile of second section 114 FIG. 5B). The second strap portion 22b can then be knotted to further insure maintenance of a constant tension.

Figure 6A:
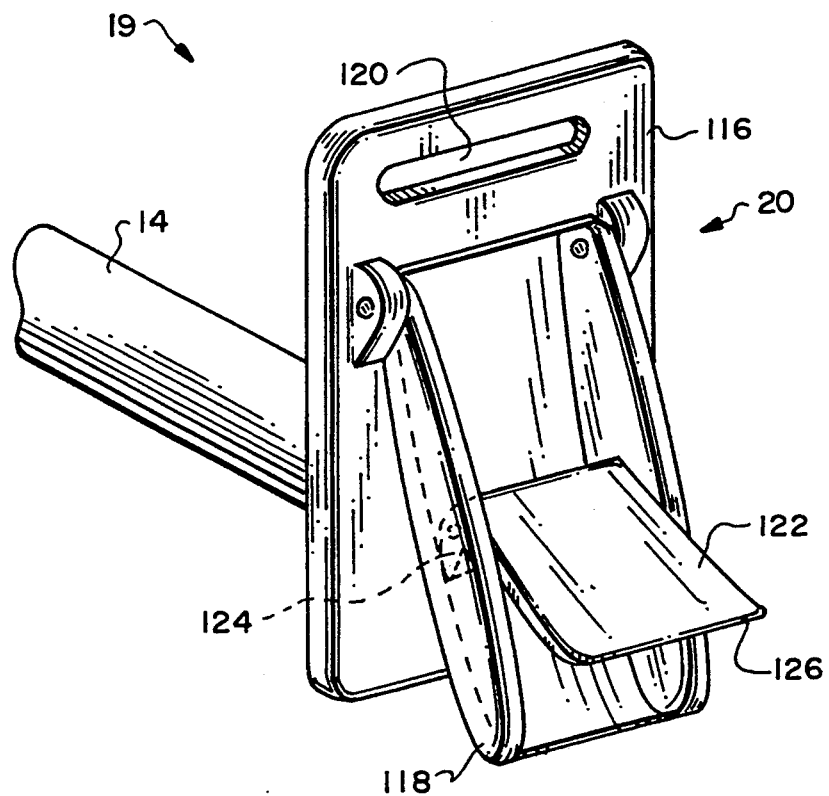
Figure 6B:
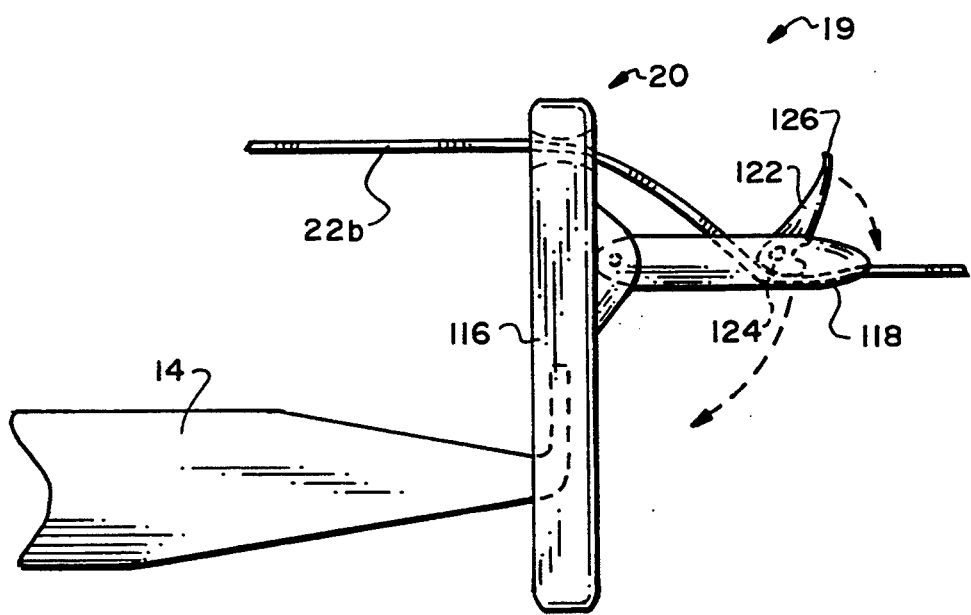

The configuration of the strap securing element 20 shown in FIGS. 6A and 6B, includes a stationary member 116 having a flange 118 pivotally attached thereto. The stationary member 116 is configured to be attached to the carrying member 14 and has an aperture 120 which is sized and shaped to receive the second strap portion 22b. Pivotally attached to the flange 118 is an L-shaped flange 122. L-shaped flange 122 includes a short portion 124, which bears against the second strap portion 22b and a longer portion 126, which is sized to accommodate a thumb of a user of the foldable carrier 10. Both the flange 118 and L-shaped flange 122 are mounted such that they will be oriented in a direction toward the stationary member 116 after the second strap portion 22b is secured in the strap securing element 20.

In operation, the second strap portion 22b is threaded through the aperture 120 and between flange 118 and the short portion 124 of L-shaped flange 122. The user then clamps L-shaped flange 122 down upon the second strap portion 22b by pressing in the direction indicated by the upper arrow of FIG. 6B. Next, the flange 118 is pressed down in the direction indicated by the lower arrow in FIG. 6B until it contacts the stationary member 116. The downward movement of flange 118 increases the tension on second strap portion 22b. The second strap portion 22b can then be knotted to further insure maintenance of a constant tension.

Figure 7A:
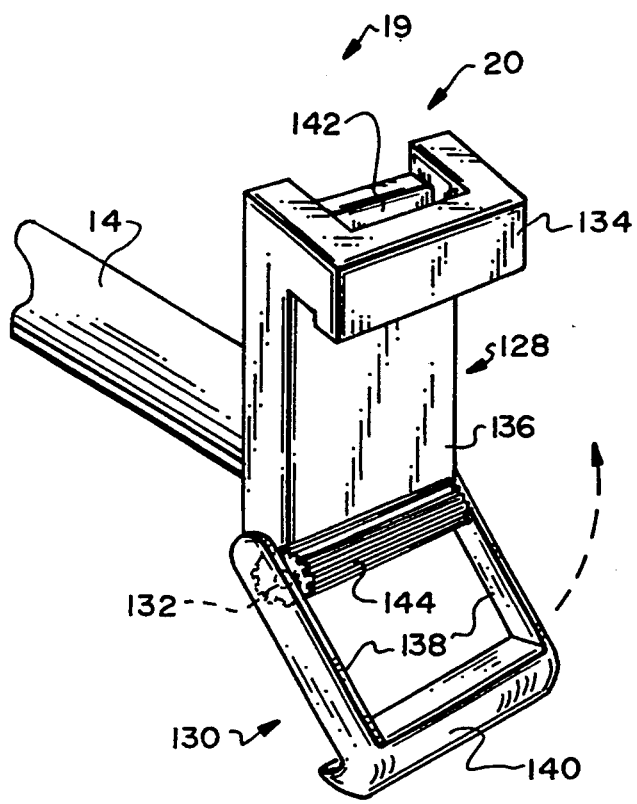
Figure 7B:
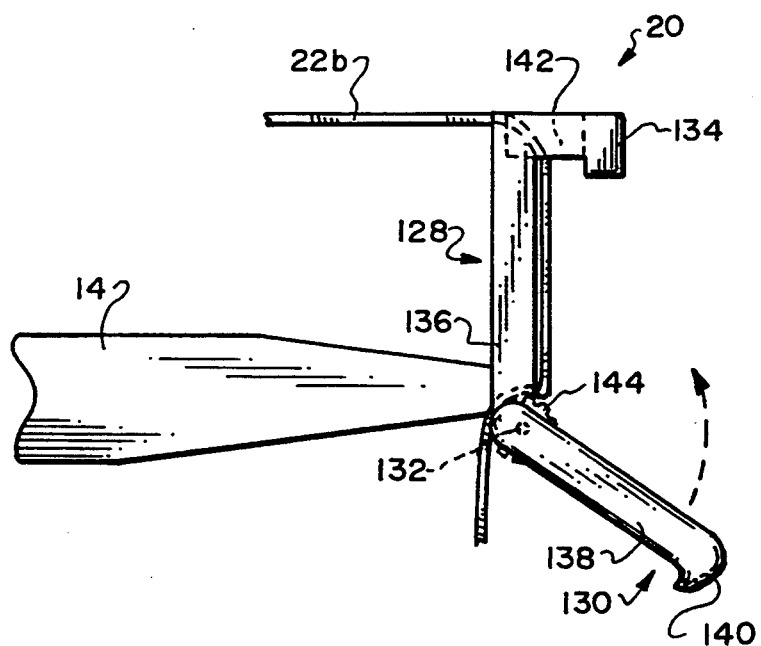

The configuration of the strap securing element 20 shown in FIGS. 7A and 7B, includes an upright member 128 having a securing flange 130 connected thereto by a axle 132. The upright member 128 has an upper strap receiving portion 134 and a rectangular base portion 136. The upper strap receiving portion 134 includes an aperture 142 which, in operation, receives and guides the second strap portion 22b. The securing flange 130 has a U-shaped profile formed by a pair of arms 138 connected by a base 140. A roller 144 is positioned on the axle 132 and connected to the arms 138 of the securing flange 130. The strap securing flange 130 is mounted on upright member 128 such that its upper portion will be tilted toward the upright member 128 after the second strap portion 22b is secured in the strap securing element 20.

In operation, a user threads the second strap portion 22b through the aperture 142 in the upper strap receiving portion 134 of the upright member 128. The second strap portion 22b is then guided between the roller 144 and the lower surface of the upright member 128. The securing flange 130 is then pivoted upwardly toward the upright member 128 until the base 140 of the strap securing flange 130 contacts the upright member 128.

As the securing flange 130 pivots it rotates the roller 144 thus placing a tension on the second strap portion 22b. The second strap portion 22b is secured in position by the snug contact between the base 140 of the strap securing flange 130 and the upright member 128. The second strap portion 22b can then be knotted to further insure maintenance of a constant tension.

Figure 8A:
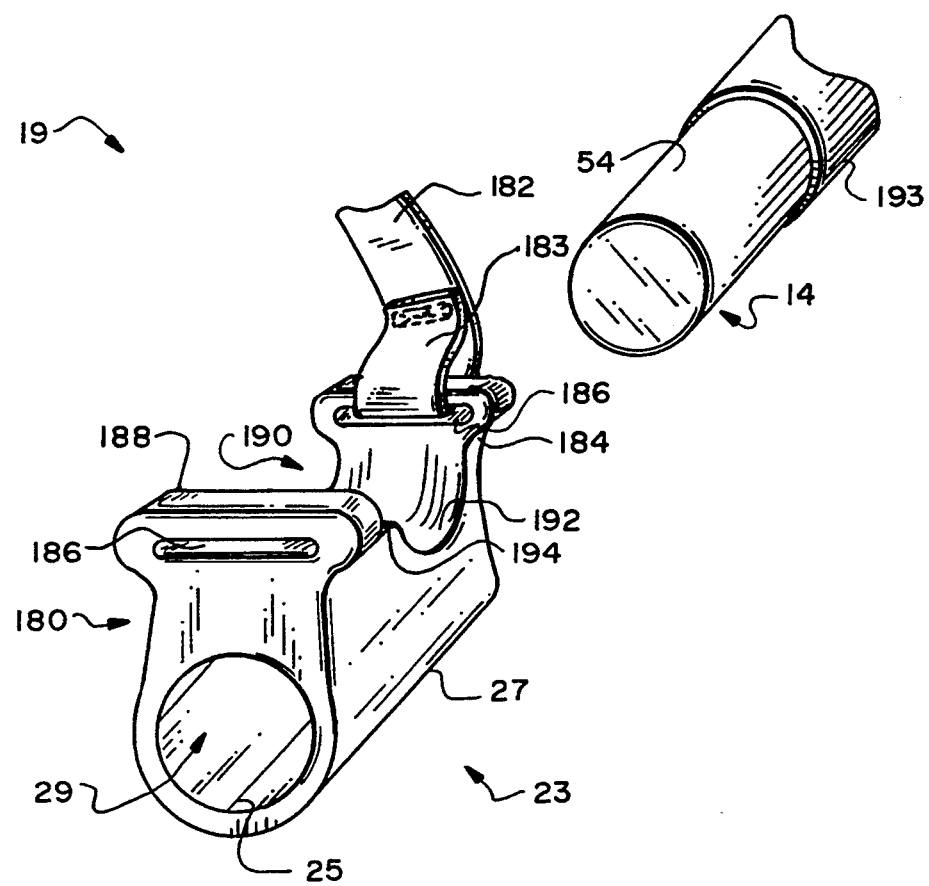
FIG. 8A is a perspective view of another embodiment of a strap tie-down system of the invention useful in connection with the carrier of FIG. 1.
Figure 8B:
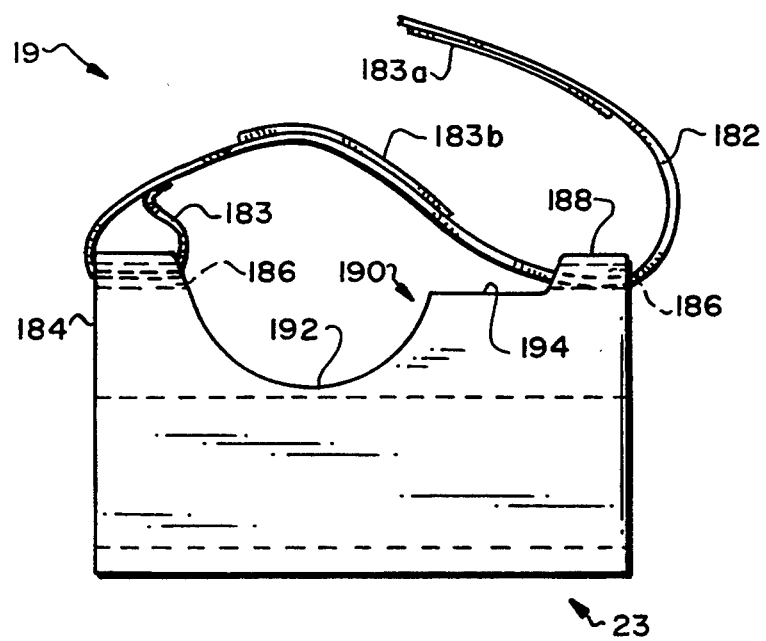
FIG. 8B is a side elevation of the embodiment of the strap securing element depicted in FIG. 8A.

The tie-down system 19 depicted in FIGS. 8A and 8B includes a mounting means 23 slidably positionable on the arms 54 and 56 of the carrying member 14. The mounting means 23 includes a body 27 with a tubular opening 29 and cradle means 180. In operation, friction grips 25 which extend inwardly from the inner surface of the opening 20 hold the means 23 in position on arms 54 and 56.

The cradle means 180 is integral with the body 27. A strap means 182 having a series of snaps, or a hook and loop fastener means 183A and 183B, for example, the type of fastener sold under the trademark VELCRO, on one of its surfaces, is connected to a first raised end 184 of the cradle means 180. More particularly, a first end 183 of the strap means 182 extends through an aperture 186 in the raised end 184. The strap 182 is secured in position by doubling-back and connecting end 183 to the body of the strap 182 using, for example, stitching. The second raised end 188 of the cradle means 180 also includes an aperture 186 sized and shaped to receive the strap 182 when the tie-down system 19 is in use as described below. Finally, the cradle means 180 includes a supporting face 190 having an indentation 192 and shelf 194. Preferably, the indentation 192 is off-set from the centerline of the cradle means 180 in the direction of the first raised end 184. The indentation 192 has a cross-sectional configuration which is substantially congruent to that of the material forming the frame of the bicycle. Typically, the indentation 192 has a semi-circular configuration. The mounting means 23 can be manufactured from either plastic or rubber, however, extruded rubber is preferred.

In operation an equal number of mounting means 23 are placed on each of the arms 54 and 46 of carrying member 14. Typically, spacers 193 are placed between the mounting means 23 to provide separation between adjacent bicycles which are mounted on the carrier 10. Next, bicycles are positioned on the mounting means 23 such that their frames rest in the indentations 192 of those mounting means 23 positioned in similar locations on each of the arms 54 and 56. As each bicycle is placed in an indentation 192 of a mounting means 23, the strap 182 is placed over the bicycle's frame and slid through the aperture 186 in raised end 188. To secure the strap 182, it is doubled-back over itself and secured in position using the above-mentioned snaps or hook and loop fastener means 183A and 183B. By following this procedure, a series of bicycles can be loaded on the arms 54 and 56 of the carrier 10.

Figure 9A:
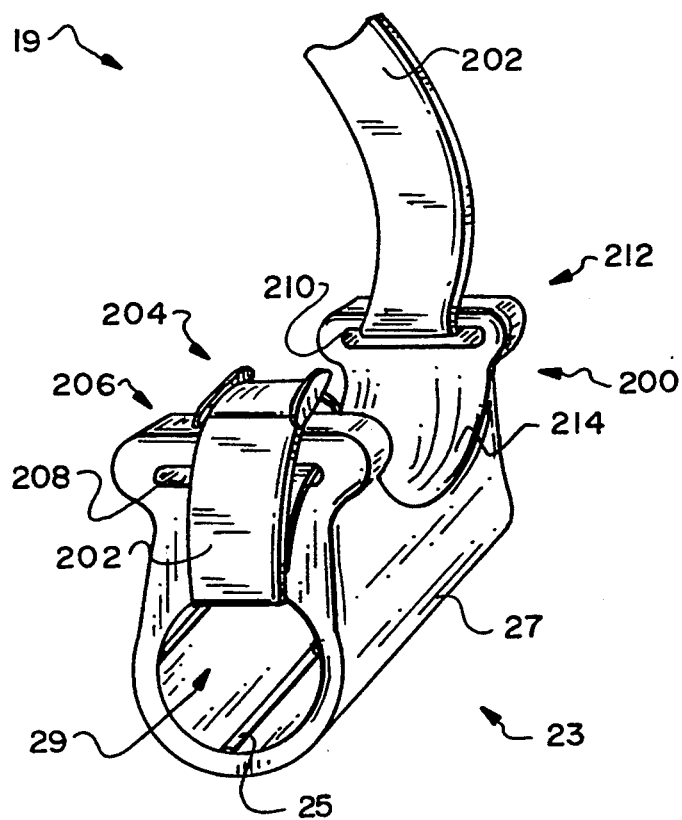
FIG. 9A is a perspective view of a further embodiment of a strap tie-down system of the invention useful in connection with the carrier of FIG. 1; and, FIG. 9B is a side elevation of the embodiment of the strap securing element depicted in FIG. 9A.
Figure 9B:
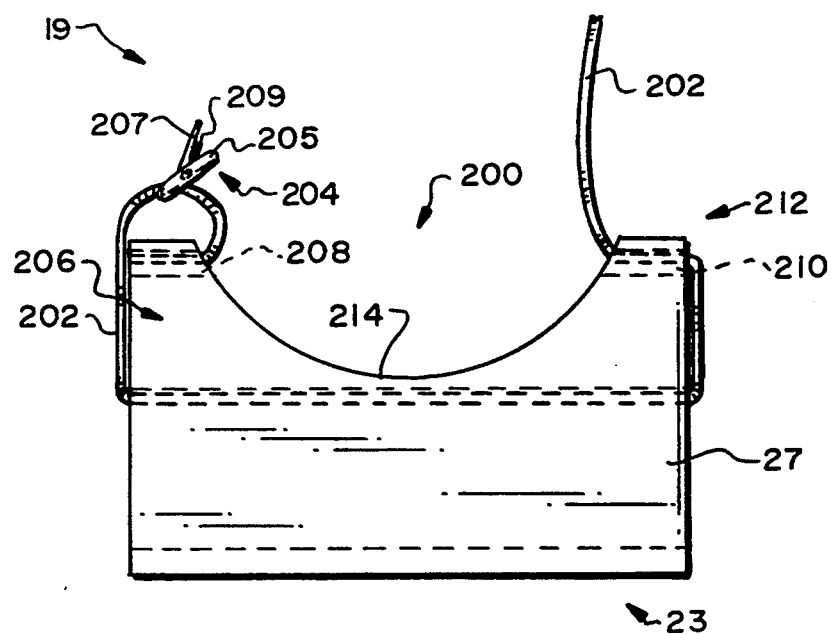

The tie-down system 19 depicted in FIGS. 9A and 9B includes a mounting means 23 slidably positionable on the arms 54 and 56 of the carrying member 14. The mounting means 23 includes a body 27 having a tubular opening 29 and cradle means 200.

The cradle means 200 is integral with the body 27. A strap means 202 having a snap buckle 204 positioned thereon is connected to a first raised end 206 of the cradle means 200. More particularly, an end of the strap means 202 is passed through an aperture 208 in the first end 206 and the snap buckle 204. The strap means 202 is secured in position by doubling-back and stitching. As best shown in FIG. 9B, the snap buckle 204 includes a flat member 205 and an L-shaped flange 207. L-shaped flange 207 includes a short portion 209, which bears against strap means 202 when the strap means 202 is positioned in the closed snap buckle 204. The L-shaped flange 207 is mounted on the flat member 205 such that it will be oriented in a direction toward the flat member 205 after the strap means 202 is secured in the snap buckle 204. Once connected to the first end 206 the strap means 202 is threaded through the hollow interior of the body 27 and an aperture 210 in the second end 212. Finally, the cradle means 200 includes an indentation 214. Preferably, the indentation 214 has a cross-sectional configuration which is substantially congruent to that of the material forming the frame of the bicycle. Typically, the indentation 214 has a semi-circular configuration. The mounting means 23 can be manufactured from either plastic or rubber, however, extruded rubber is preferred.

In operation an equal number of mounting means 23 depicted in FIGS. 9A and 9B are placed on each of the arms 54 and 46 of carrying member 14. Typically, spacers, for example those denoted by reference numeral 193 in FIG. 8A, are placed between these mounting means 23 to provide separation between adjacent bicycles which are mounted on the carrier 10. Next, bicycles are positioned on the mounting means 23 such that their frames rest in the indentations 214 of those mounting means 23 positioned in similar locations on each of the arms 54 and 56. As each bicycle is placed in an indentation 214, the strap means 202 is placed over the bicycle's frame and threaded through the snap buckle 204. The user then clamps L-shaped flange 207 down upon the strap means 202 by pressing it in a generally downward direction, thereby locking the strap means and securing the bicycle to the mounting means 23. By following this procedure, a series of bicycles can be loaded on the arms 54 and 56 of the carrier 10.

The foldable carrier 10 is moved from its collapsed stored position shown in FIG. 1 to its extended operational position shown in FIG. 2 by pivoting the carrying member 14 and supporting member 16. In particular, the carrying member 14 and supporting member 16 are pivoted until they are oriented substantially perpendicular to the frame 12. With regard to the locking element 18, as the carrying member 14 moves into its extended position, the arm means 72 travels along the linear portion 104 of the slot 102 and into the indentation 107 of the U-shaped end 106. Bias means 111 secures the arm means 72 in position in the indentation 107. Concurrently, the supporting member 16 pivots until stop elements 96 contact the frame 12, thus also securing the supporting means 16 in a position substantially perpendicular to the frame 12. Once the carrying member 14 and supporting member 16 are positively locked in position, the foldable carrier 10 can be positioned on the trunk or tailgate of a vehicle 160. The extended foldable carrier 10 can be secured to the vehicle 160, as shown in FIGS. 2 and 3, using an upper strap 22a and a lower adjustable strap 146 having an attachment flange 148 thereon. Bicycles can then be loaded on the foldable carrier 10. In the final steps, the chosen tie-down system 19 is utilized to secure any bicycles to the carrier 10.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

What is claimed is:

1. A folding carrier mountable on a motor vehicle for carrying bicycles, said carrier comprising:

a frame;

a carrying member pivotally mounted to said frame, said carrying member movable about an axis between an operative extended position and a collapsed stored position, said carrying member and said frame being in substantially perpendicular relationship to one another when said carrying member is in its extended position, said carrying member and said frame being in substantially side-by-side relationship when said carrying member is in its collapsed position, said carrying member having a pair of arms;

a mounting means positioned on each arm of said carrying member, each said mounting means being rotatable about and slidable on and along each said arm of said carrying member, said mounting means having a body with a cradle means, said cradle means having first and second raised ends, and a supporting face positioned between said first and second raised ends, said supporting face being sized and shaped to receive a portion of said bicycles, said first and second raised ends being sufficiently separated to permit said portion of said bicycles to be removably and replaceably positioned on said supporting face;

at least one spacer means positioned on each said arm of said carrying member, said spacer means serving to position each said mounting means at a selected position on each said arm of said carrying members; and a separate strap means operatively connected to said first and second raised ends of said cradle means for securing said portion of said bicycles on said cradle means, said separate strap means including a belt means and a buckle means, said belt means engaging said portion of said bicycles received in said supporting face of said cradle means, said belt means being adjustably positionable in said buckle means for tightening said belt means to securely hold said portion of said bicycles received in said supporting face of said cradle means.

2. A carrier mountable on a motor vehicle for carrying bicycles, said carrier comprising:

a frame;

a carrying member mounted to said frame, said carrying member having a pair of arms;

a mounting means positioned on each arm of said carrying member, each said mounting means being rotatable about and slidable on and along each said arm of said carrying member, said mounting means having a body with a cradle means, said cradle means having first and second raised ends, and a supporting face positioned between said first and second raised ends, said supporting face being sized and shaped to receive a portion of said bicycles, said first and second raised ends being sufficiently separated to permit said portion of said bicycles to be removably and replaceably positioned on said supporting face;

at least one spacer means positioned on each said arm of said carrying member, said spacer means serving to position each said mounting means at a selected position on each said arm of said carrying members; and a separate strap means operatively connected to said first and second raised ends of said cradle means for securing said portion of said bicycles on said cradle means, said separate strap means including a belt means and a buckle means, said belt means engaging said portion of said bicycles received in said supporting face of said cradle means, said belt means being adjustably positionable in said buckle means for tightening said belt means to securely hold said portion of said bicycles received in said supporting face of said cradle means.

3. A carrier mountable on a motor vehicle for carrying bicycles, said carrier comprising:

a frame;

a carrying member mounted to said frame, said carrying member having a pair of arms;

a mounting means positioned on each arm of said carrying member, said mounting means having a body with a cradle means, said cradle means having first and second raised ends, and a supporting face positioned between said first and second raised ends, said supporting face being sized and shaped to receive a portion of said bicycles, said first and second raised ends being sufficiently separated to permit said portion of said bicycles to be removably and replaceably positioned on said supporting face;

at least one spacer means positioned on each said arm of said carrying member, said spacer means serving to position each said mounting means at a selected position on each said arm of said carrying members; and a separate strap means operatively connected to said first and second raised ends of said cradle means for securing said portion of said bicycles on said cradle means, said separate strap means including a belt means and a buckle means, said belt means engaging said portion of said bicycles received in said supporting face of said cradle means, said belt means being adjustably positionable in said buckle means for tightening said belt means to securely hold said portion of said bicycles received in said supporting face of said cradle means.

* * * * *